United States Patent
Maleki et al.

(10) Patent No.: US 9,413,189 B2
(45) Date of Patent: Aug. 9, 2016

(54) METHOD AND SYSTEM FOR RAPID CHARGING OF RECHARGEABLE CELLS

(71) Applicant: MOTOROLA MOBILITY LLC, Chicago, IL (US)

(72) Inventors: Hossein Maleki, Duluth, GA (US); Jason N. Howard, Alpharetta, GA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 298 days.

(21) Appl. No.: 14/262,954

(22) Filed: Apr. 28, 2014

(65) Prior Publication Data
US 2015/0155719 A1 Jun. 4, 2015

Related U.S. Application Data

(60) Provisional application No. 61/911,584, filed on Dec. 4, 2013.

(51) Int. Cl.
H02J 7/04 (2006.01)
H02J 7/16 (2006.01)
H02J 7/00 (2006.01)

(52) U.S. Cl.
CPC ....... H02J 7/0091 (2013.01); *H02J 2007/0039* (2013.01)

(58) Field of Classification Search
CPC ................ H02J 7/0091; H02J 2007/0039
USPC .................................................. 320/151
See application file for complete search history.

(56) References Cited

U.S. PATENT DOCUMENTS 5,583,871 A * 12/1996 Simmonds ............ H01M 10/44
320/151
6,075,342 A 6/2000 Koenck
(Continued)

FOREIGN PATENT DOCUMENTS

EP 0997962 A2 5/2000
WO 2013109454 A1 7/2013

OTHER PUBLICATIONS

International Search Report mailed on Mar. 24, 2015, issued in connection with International Patent Application No. PCT/US2014/068393, filed on Dec. 3, 2014.

(Continued)

*Primary Examiner* — Jack Chiang
*Assistant Examiner* — Brandon Bowers
(74) *Attorney, Agent, or Firm* — McDonnell Boehnen Hulbert & Berghoff LLP

(57) ABSTRACT

A method (300) and system (600) of adjusting a charging current to one or more cells (601) is provided. The method includes obtaining (301) a plurality of charging time periods, where each charging time period defined as a time period required to charge the one or more cells with a predefined current at one of a plurality of different temperatures. A temperature of the one or more cells is determined (302). A predetermined current is scaled (306) by a quotient of a first charging time period defined by a first one of the plurality of different temperatures divided by a second charging time period defined by a second one of the plurality of different temperatures to obtain a magnitude of the charging current. The cells are charged (307) with the charging current at the magnitude to more rapidly charge the one or more cells at temperatures above room temperature.

20 Claims, 7 Drawing Sheets

(56) References Cited

U.S. PATENT DOCUMENTS

| | | | |
|---|---|---|---|
| 6,949,914 B2* | 9/2005 | Aradachi | H02J 7/047 320/150 |
| 8,299,759 B2* | 10/2012 | Okamura | H02J 7/0031 320/132 |
| 2008/0212249 A1 | 9/2008 | Grewe et al. | |
| 2009/0153104 A1 | 6/2009 | Matsuura et al. | |
| 2010/0156356 A1 | 6/2010 | Asakura et al. | |
| 2013/0138370 A1 | 5/2013 | Oh et al. | |
| 2013/0257350 A1 | 10/2013 | Yen | |

OTHER PUBLICATIONS

Written Opinion of the International Searching Authority mailed on Mar. 24, 2015, issued in connection with International Patent Application No. PCT/US2014/068393, filed on Dec. 3, 2014.

* cited by examiner

METHOD AND SYSTEM FOR RAPID CHARGING OF RECHARGEABLE CELLS

BACKGROUND

1. Technical Field

This disclosure relates generally to charging rechargeable cells, and more particularly to rapidly charging rechargeable cells.

2. Background Art

Portable electronic devices, such as cellular telephones, laptop computers, tablet computers, pagers, and two-way radios, derive their portability from batteries having rechargeable cells. Rechargeable batteries allow these devices to travel with users wherever they may go. A typical rechargeable battery disposed within one of these devices may be charged and discharged hundreds of times over its lifetime. This is particularly true due to the daily reliance people increasingly place upon their personal electronic devices.

When the energy stored within the rechargeable cells of a rechargeable battery becomes depleted, it is necessary to attach a power supply to either the device to which the rechargeable battery is attached or to the rechargeable battery itself to charge the cells. Charging takes time. While the cells are tethered to a charger, it is not available for travel with the user. The longer the charging process takes, the longer a user must wait before again being able to take their mobile device with them on the go. It would be advantageous to have a method or system to more rapidly charge depleted rechargeable cells.

Figure 1:
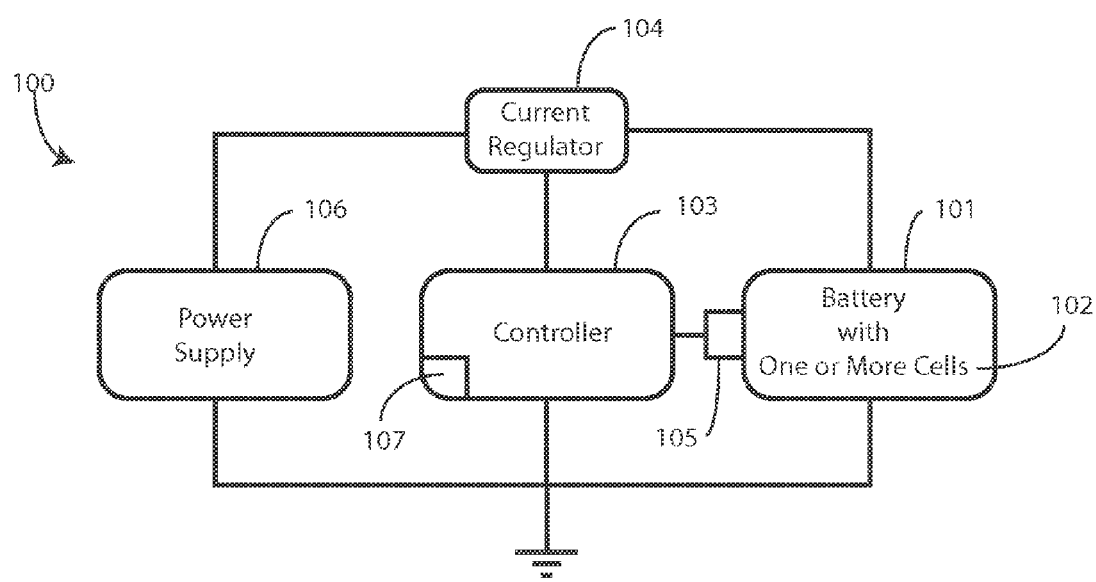
FIG. 1 illustrates an explanatory system configured in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to rapidly charging rechargeable cells in accordance with one or more embodiments of the disclosure. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of rapidly charging rechargeable cells as a function of temperature as described herein. The non-processor circuits may include, but are not limited to, a radio receiver, a radio transmitter, signal drivers, clock circuits, power source circuits, and user input devices. As such, these functions may be interpreted as steps of a method to perform the rapid charging as a function of temperature. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Market demand for portable electronic devices having increased power and functionality is growing dramatically. Portable electronic devices such as mobile phones, laptop computers, tablet devices, media players, gaming devices, health monitors, navigation devices and so forth are continually becoming physically smaller while their computing power and feature set is increasing. Thus, while the demand for energy in these devices is increasing, their reducing size limits how large an internal rechargeable battery can be. As noted above, reduced charging times would be advantageous. However, in charging systems there is generally a trade off between energy density, i.e., how much energy a cell can store, and the maximum rate at which the cell can be charged.

Thus, it generally takes longer to charge a battery that can operate a tablet for ten hours on a single charging cycle than it does a tablet that only operates six hours on a single charging cycle. This creates a conundrum for the designer who wants both rapid charge times and long battery life.

Most modern portable electronic devices employ lithium-based cells for operation. Lithium-ion technology is a popular rechargeable cell technology that is prevalent in many mobile devices. The energy density of lithium-ion cells, which is measured in units of energy per volume (watt-hours/liter), is highly dependent upon the densities of the active material coatings of the anode and cathode disposed within the cell. A higher density coating on the anode and cathode generally increases the energy density of the cell. However, when the coating density increases, so too does the internal impedance of the cell. High-density coating results in higher impedances within the cell. The higher impedances limit the maximum charge and discharge rate capability of the cell. Moreover, this increased impedance can have negative effects on cycle life and thermal stability as well. When a high energy density cell is charged or discharged at a current above that for which it is rated, anode potential can be driven down to a level that allows the active lithium to plate on the anode. The lithium reacts with the electrolyte of the cell forming salt deposits on the anode, thereby becoming trapped, which in turn leads to capacity fade and reduced cycle life. The resulting plating may also compromise operational reliability of the cell.

Experimental testing has determined that the internal impedance of lithium-ion cells decreases with increasing temperature. From an electrical standpoint, this is contrary to ordinary expectations, in which conductive elements have impedance that increases—rather than decreases—as temperature increases. (Super conductors are cooled, not heated.) Embodiments of the present disclosure use this decreased impedance to reduce charging time in certain situations. Embodiments of the disclosure reduce the charging time of lithium-ion cells by taking advantage of the temperature effects on impedance. However, the methods and systems disclosed below do this without adversely affecting cycle life as charging rates are increased only in certain situations.

In one embodiment, a method of reducing charging time includes selectively increasing charge current at certain temperatures above a predetermined temperature, which is room temperature in one embodiment. In one embodiment, a method of adjusting a charging current to one or more cells comprises obtaining a plurality of charging time periods. In one embodiment, each charging time period is defined as the time period required to charge the one or more cells with a predefined current at one of a plurality of different temperatures. In one embodiment, the predefined current is the "1-C" rate. A "C" rate refers to a charge current as it relates to the capacity of the cell. Where a cell has a capacity rated in milliamp-hours, its "1-C" rate would be the milliamp number of the capacity measurement. Illustrating by example, a 1600 milliamp-hour rechargeable cell has the 1-C rate of 1600 milliamps, or 1.6 amps. The 0.5-C rate would be 800 milliamps. The 2-C rate would be 3.2 amps, and so forth.

In one embodiment, a temperature sensor determines the temperature of the one or more cells of the system. For temperatures above a predetermined temperature, such as room temperature, one or more processors of the system can scale the predefined current by a quotient defined by a charging time at the predefined current at room temperature divided by the charging time at the predefined current at the temperature sensed by the temperature sensor. Said differently, in on embodiment the one or more processors scale the predefined current by a quotient of a first charging time period defined by a first one of the plurality of different temperatures divided by a second charging time period defined by a second one of the plurality of different temperatures, where the second one of the plurality of different temperatures is closer to the sensed temperature than the first one of the plurality of different temperatures. From this scaling, a magnitude of the charging current is obtained. In one embodiment, this magnitude is greater than a predetermined charge rate, such as a 0.5-C rate or a 1-C rate. The one or more processors then cause a current regulator to charge the cells with the charging current at the magnitude.

Illustrating by example, in a single-cell system the temperature sensor may determine that the temperature of the cell is forty degrees centigrade (room temperature is about 23 degrees centigrade). A quotient defined by the charge time of the cell, using a 1-C rate, at room temperature divided by the charge time of the cell at the 1-C rate at forty degrees centigrade can be calculated, read from a look-up table, or otherwise obtained. Since the impedance of the cell is lower at forty degrees centigrade, the 1-C charge time will be lower than at room temperature. Accordingly, the quotient will be greater than one. A predetermined charge current, which is 1-C in one or more embodiments, can then be scaled by the quotient to obtain a charging current suitable for use while the cell temperature is at forty degrees centigrade. As temperature changes, the quotient can be recalculated or re-obtained. Moreover, the quotient can be adjusted as a function of a number of cycles experienced by the cells. Use of the quotient results in a charging time that is decreased. However, as charging current is increased in proportion to the reduction in cell impedance, no adverse effects on capacity or cycle life occur.

Turning now to FIG. 1, illustrated therein is one explanatory apparatus 100 configured in accordance with one or more embodiments of the disclosure. A rechargeable battery 101 having one or more rechargeable cells 102 is operable with a current regulator 104 to receive current from a power supply 106 or charger. The current regulator is coupled serially with the one or more rechargeable cells 102 of the rechargeable battery 101. A control circuit 103 is operable with the current regulator 104 to adjust the current flowing to the one or more rechargeable cells 102.

The control circuit 103 is also operable with a temperature sensor 105. The temperature sensor 105 can be integral to the rechargeable battery 101 or external thereof. The temperature sensor 105 is operable to sense the temperature of the one or more rechargeable cells 102 of the rechargeable battery 101. In one embodiment, the temperature sensor 105 may determine the cell temperature directly. In another embodiment, the temperature sensor 105 may apply an offset to account for thermal lag between the one or more rechargeable cells 102 and the temperature sensor 105.

The control circuit 103 is operable with a memory 107. The memory 107 may be integral with the control circuit 103, i.e., an "on-board" memory. Alternatively, the memory 107 can be external to the control circuit 103. In one embodiment, the memory 107 can store a plurality of charging time periods for the one or more rechargeable cells 102. In one embodiment, each charging time period defined as a time period required to charge the one or more rechargeable cells 102 with a predefined current at one of a plurality of different temperatures.

Illustrating by example, in one embodiment the predefined current is a 1-C current. (Note that the predefined current can be other rates, such as a 0.5-C rate, 2-C rate, and so forth.) Thus, if each cell of the one or more rechargeable cells 102 is a 1000 milliamp-hour cell, the 1-C current would be 1 amp. In one embodiment, the memory 107 stores a plurality of charging time periods, each at a different temperature, and each using the 1-C current. A first charging time period may be the amount of time to charge the one or more rechargeable cells 102 at a predetermined temperature, such as room temperature, which is about 23 degrees centigrade. (Note that the predefined temperature can be other temperatures as well, both above and below room temperature.) A second charging time period may be the amount of time required to charge the one or more rechargeable cells 102 at thirty degrees centigrade. A third charging time period may be the amount of time required to charge the one or more rechargeable cells 102 at thirty-five degrees centigrade, and so forth.

As noted above, in one embodiment, the temperature sensor 105 is operable to sense the temperature of the one or more rechargeable cells 102 of the rechargeable battery 101. The control circuit 103 is configured to receive an indication of cell temperature from the temperature sensor 105. The control circuit 103 can then select a first charging time period from the memory 107. The first charging time period is defined by a first time period to charge the one or more rechargeable cells 102 at a first temperature with the predefined current, which is 1-C in this example. The control circuit 103 can then select a second charging time period defined by a second time period to charge the one or more rechargeable cells 102 at a second temperature with the predefined current. In one embodiment, the second temperature is closer to the temperature of the one or more rechargeable cells 102 as sensed by the temperature sensor 105 than is the first temperature.

An example may help make the operations of the preceding paragraph clearer. Presume that the temperature of the one or more rechargeable cells 102 is 36 degrees centigrade. The control circuit 103 can select a first charging time period to charge the one or more rechargeable cells 102 at a 1-C rate at a first temperature, which may be room temperature. The control circuit 103 can then select a second charging time period to charge the one or more rechargeable cells 102 at the 1-C rate at a second temperature that is closer to the temperature of the one or more rechargeable cells 102 as sensed by the temperature sensor 105 than is the first temperature. In this example, the second temperature may be 35 degrees centigrade, which is closer to 36 degrees centigrade than is room temperature.

After this is done, the control circuit 103 can multiply the predefined current by a quotient of the first charging time period divided by the second charging time period to obtain a charging current. In this example, the control circuit 103 would multiply the 1-C current by a quotient of the time to charge at room temperature divided by the time to charge at 35 degrees centigrade. If the time to charge at room temperature is 135 minutes, and the time to charge at 35 degrees centigrade is 111 minutes, the quotient would be about 1.22. Accordingly, the charging current would be the 1-C rate times 1.22. The control circuit 103 could then cause the current regulator 104 to charge the one or more rechargeable cells 102 at the charging current. This charging could continue until the one or more rechargeable cells 102 were charged. Alternatively, the charging current could be recalculated as temperature changes.

In the above example, the control circuit 103 selected two charging time periods that define the quotient from memory 107. In another embodiment, rather than selecting two charging time periods, the control circuit 103 can simply select the quotient as a function of temperature. The quotient is also referred to herein as the "Z-factor." In one embodiment, the Z-factor is defined as the charging time at a predefined current at a predetermined temperature divided by the charging time at the same current at a temperature greater than the predetermined temperature. Accordingly, where the predetermined temperature is room temperature, which is 23 degrees centigrade, and the denominator is the charging time associated with 40 degrees centigrade, the Z-factor for 40 degrees centigrade may be 135 minutes divided by 102 minutes, or 1.32. An illustrative table of Z-factors for one explanatory single lithium-ion cell is set forth below:

TABLE 1

| Charging Temperature (C) | Charging Time (min.) | 1-C Charging Current (mA) | Z-Factor | Current Scaled by Z-Factor (mA) |
| --- | --- | --- | --- | --- |
| 23 (Room) | 135.9 | 2010 | 1.00 | 2010 |
| 35 | 111.1 | 2010 | 1.22 | 2460 |
| 40 | 105.1 | 2010 | 1.29 | 2600 |
| 45 | 101.8 | 2010 | 1.34 | 2685 |
| 50 | 98.5 | 2010 | 1.38 | 2776 |
| 55 | 96.2 | 2010 | 1.41 | 2843 |

Accordingly, rather than selecting first and second charging time periods defining the quotient, in one embodiment the control circuit 103 simply selects the Z-factor from memory 107 and scales the predefined current accordingly. In another embodiment, the control circuit 103 can simply select the Z-factor scaled current from memory 107 and can cause the current regulator 104 to charge the one or more rechargeable cells 102 with the Z-factor scaled charging current.

It should be noted that while charging time periods were determined in five-degree increments in TABLE 1, other increments can be used as well. For example, the charging time periods for currents above room temperature can be obtained at one-degree increments, two-degree increments, three-degree increments, and so forth, depending upon the resolution desired. It should also be noted that while room temperature is referred to in the example above as 23 degrees centigrade, as used herein "room temperature" can refer to a temperature of about 20 degrees centigrade, plus or minus five degrees, or twenty-five degrees centigrade, plus or minus five degrees. Accordingly, "room temperature" can include a range from 15 degrees centigrade to about 30 degrees centigrade.

It should also be noted that the Z-factor can be based upon cumulative charging time periods instead of a single charging time period. In TABLE 1, the times shown are for a single cycle. Embodiments of the disclosure contemplate that rather than using a single charging time period, a sum of charging time periods can be used in one or more embodiments. The properties of lithium-based cells are known to change with use and age. For example, energy storage capacity can fade. Additionally, the cell impedance may increase. These changes can effect charge time. Accordingly, it can be necessary to correct or adjust the calculated Z-factor to compensate for the property changes occurring due to use and age.

In one or more embodiments, the Z-factors from TABLE 1 can be expanded as a function of battery cycling. For example, charging duration as a function of temperature can measured for new cells. Then, after the cells are fully charged and discharged for some predetermined number of cycles, such as 100, 200, or 500 cycles, charging duration as a function of temperature can be measured again. This process can be repeated after another incremental number of cycles. The process can be repeated again until a predetermined maximum expected number of cycles is reached for the cells. One example of the expansion of TABLE 1 is shown in TABLE 2 below:

TABLE 2

| Accumulative Charge Time | Z-Factor | | | Z-Current | | |
|---|---|---|---|---|---|---|
| | 35° C. | 45° C. | 55° C. | 35° C. | 45° C. | 55° C. |
| 1 | 1.1 | 1.3 | 1.4 | 1.1 * C-Rate | 1.3 * C-Rate | 1.4 * C-Rate |
| 2 | 1.1 | 1.3 | 1.4 | 1.1 * C-Rate | 1.3 * C-Rate | 1.4 * C-Rate |
| 3 | 1.1 | 1.3 | 1.4 | 1.1 * C-Rate | 1.3 * C-Rate | 1.4 * C-Rate |
| 4 | 1.1 | 1.3 | 1.4 | 1.1 * C-Rate | 1.3 * C-Rate | 1.4 * C-Rate |

In one embodiment, a system configured in accordance with one or more embodiments of the disclosure can monitor the number of cycles experienced by the cells and uses the incremental cycle number data in TABLE 2 to calculate the Z-factor. In another embodiment, it may be preferred to estimate "cycle number" by tracking the "cumulative charge" or "cumulative discharge" capacity. For example, cumulative charge is the sum of total coulombs (or milliamp-hours) passed into the cells. Cycle number can then be estimated by dividing cumulative charge by nominal cell capacity. This approach simplifies the process of correlating partial cycles in field use with full cycles used to generate TABLE 2.

In one or more embodiments, the Z-factor is used when the temperature of the one or more rechargeable cells 102, as sensed by the temperature sensor 105, is greater than a predetermined temperature, which is room temperature in one or more embodiments. Thus, in one or more embodiments the control circuit 103 is to cause the current regulator 104 to charge the one or more rechargeable cells 102 at the predefined current, which is the 1-C rate in this example, whenever the temperature of the one or more rechargeable cells 102 is less than room temperature.

Figure 2:
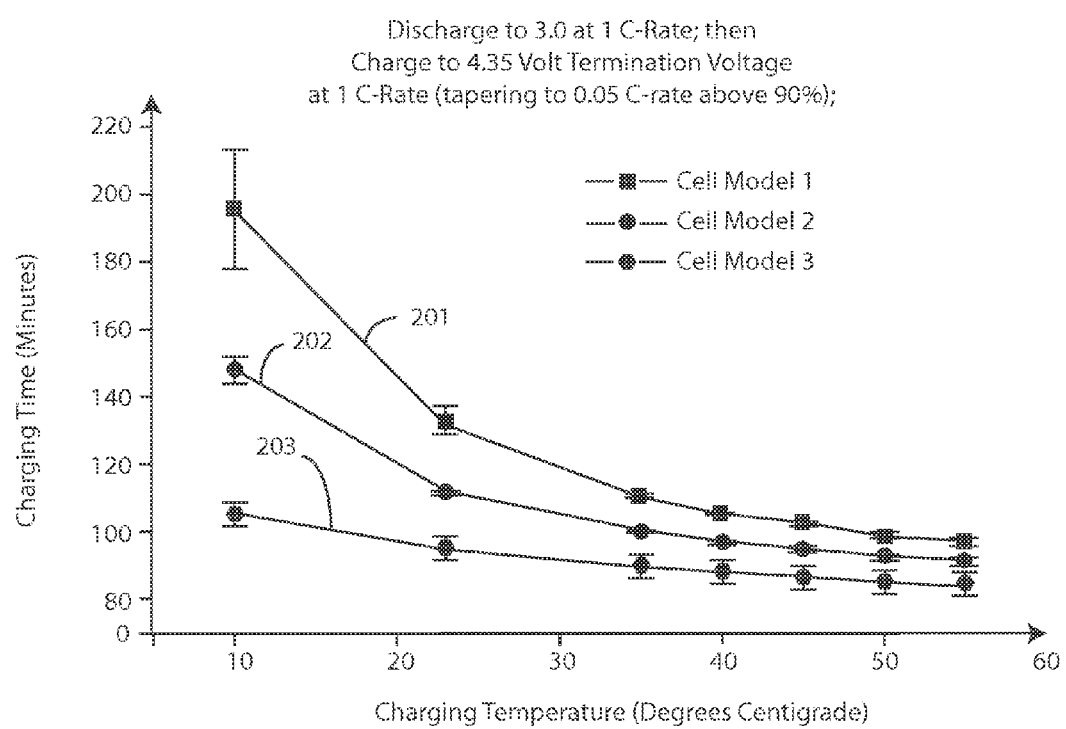
FIG. 2 illustrates explanatory charging times versus temperature for rechargeable cells in accordance with one or more embodiments of the disclosure.

Turning now to FIG. 2, illustrated therein are three charging time period curves 201,202,203 obtained by experimental testing that illustrate how charging time periods decrease as a function of temperature. Each charging time period curve 201,202,203 corresponds to a different model of lithium-ion cell. Each charging time period curve 201,202,203 was obtained by discharging at a 1-C rate to 3.0 volts, and then charging at a 1-C rate to 4.35 volts, with current tapering to 0.05 amps while holding the voltage at a constant voltage, such as 4.35 volts for a single cell. As is clearly shown, the charging time period decreases with increasing temperature regardless of cell model. It is this discovery that embodiments of the disclosure exploit for reduced charging times above room temperature without plating, cycle life degradation, or capacity degradation.

Figure 3:
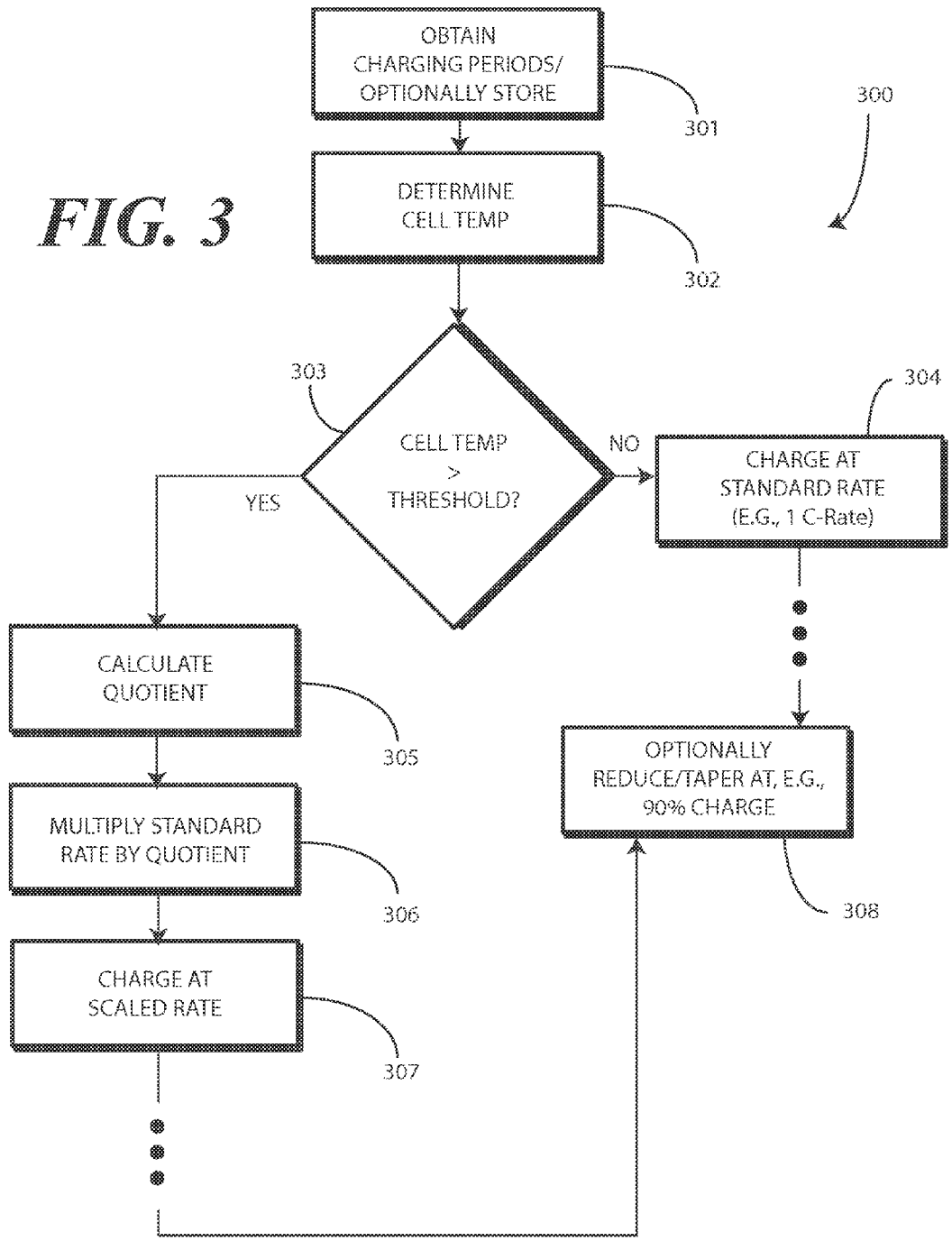
FIG. 3 illustrates an explanatory method in accordance with one or more embodiments of the disclosure.

Turning now to FIG. 3, illustrated therein is a method 300 of adjusting charging current to one or more cells in accordance with on or more embodiments of the disclosure. At step 301, the method 300 obtains a plurality of charging time periods. In one embodiment, step 301 can include storing the plurality of charging time periods in a memory operable with the one or more processors. In one or more embodiments, the plurality of charging time periods can each comprise charging time periods accumulated across a plurality of charging cycles.

In one embodiment, the plurality of charging time periods can be from experimental testing in a laboratory that characterizes the charge time versus temperature performance of the one or more cells in use in a manner similar to the charging time period curves (201,202,203) obtained in FIG. 2. In one embodiment, each charging time period obtained at step 301 is defined as a time period required to charge the one or more cells with a predefined current at one of a plurality of different temperatures.

At step 302, the method 300 determines the temperature of the one or more cells. In one or more embodiments, the temperature is determined with a temperature sensor.

At decision 303, the method 300 decides whether the temperature determined at step 302 is above or below a predetermined temperature. In one embodiment, when the temperature is below the predetermined temperature, be it room temperature or another temperature, the one or more cells are charged at the predetermined current at step 304. Accordingly, in one embodiment the method 300 charges the one or more cells at the predetermined current (1-C in one or more embodiments) when the temperature of the one or more cells is lower than the predetermined temperature. Examples of the predetermined temperature include values of between zero and thirty degrees centigrade. In one embodiment, the predetermined temperature is room temperature. However, the predetermined temperature can be higher than, or lower than, the predetermined temperature.

Where the temperature determined at step 302 is above the predetermined temperature, which can be room temperature, at step 306, in one embodiment, the method 300 scales the predetermined current by a quotient of a first charging time period defined by a first one of the plurality of different temperatures divided by a second charging time period defined by a second one of the plurality of different temperatures. In one embodiment, the predetermined current is a 1-C current. (The quotient is optionally calculated or computed at optional step 305.) In one embodiment, the first one of the plurality of different temperatures is less than the second one of the plurality of different temperatures.

In one embodiment, the first charging time period is a charging time period occurring at the predetermined temperature, which can be room temperature. In one embodiment, the second charging time period is a charging time period occurring within a predefined range, such as five degrees, of the temperature determined at step 302. In one embodiment, the second one of the plurality of different temperatures closer to the temperature than the first one of the plurality of different temperatures. In one embodiment, step 302 obtains a magnitude of the charging current.

At step 307, the method 300 then charges the one or more cells with the charging current at the magnitude calculated at step 306. As noted above, in one embodiment charging at the magnitude calculated at step 306 only occurs when the first one of the plurality of different temperatures is less than the temperature. Otherwise, step 307 can comprise charging the one or more cells with the predetermined current.

In one or more embodiments, at optional step 308, the method 300 can reduce the charging current. For example, step 308 can include reducing the magnitude of the charging current when a voltage of the one or more cells exceeds a predetermined threshold. Alternatively, step 308 can include tapering the charging current when a voltage of the one or more cells exceeds a predetermined threshold. For example, if the method 300 is charging a single-cell system where the cell has a termination voltage of 4.35 volts, step 308 may reduce the current when the cell reaches 4.35 volts. Alternatively, step 308 may taper the current from the magnitude calculated at step 306 to a taper current of, for example, 0.05 amps, when the capacity of the cell crosses a predetermined threshold of capacity, for example, 90% of full charge capacity.

Figure 4:
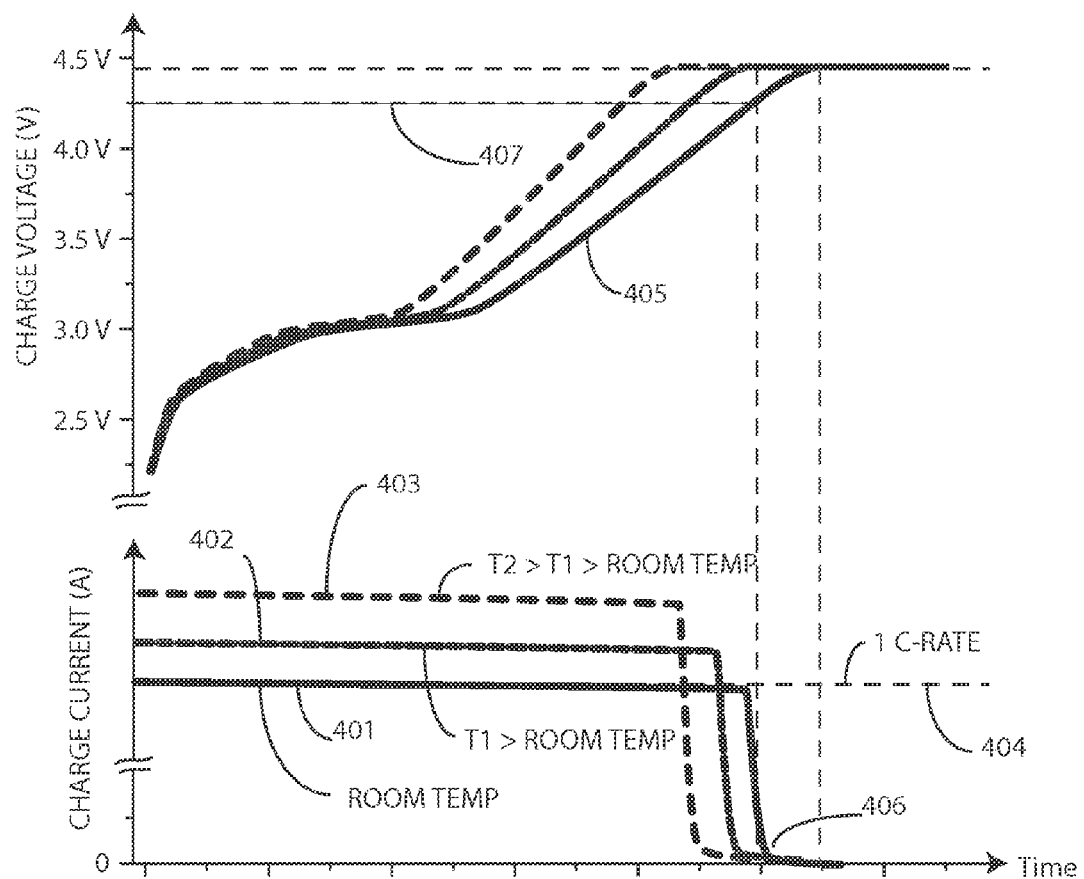
FIG. 4 illustrates explanatory charging curves in accordance with one or more embodiments of the disclosure.

Turning now to FIG. 4, illustrated therein are three charging currents 401,402,403 that occur as a result of the method (300) of FIG. 3. Charging current 401, which charges the cells at a 1-C rate 404, occurs where the temperature is room temperature or cooler. However, at a first temperature that is greater than room temperature, the charging current 402 has been scaled by the Z-factor to be higher than the 1-C rate 404. At a second temperature higher than both the first temperature and room temperature, the charging current 403 has been scaled by a larger Z-factor to be higher than charging current 402. FIG. 4 effectively defines charging currents that are scaled by the inverse of the charging durations defined in FIG. 2. Each results in cell voltage 405 charging more rapidly as temperature increases. As noted above, in one or more embodiments the charging current can taper 406 when cell voltage 405 increases above a predetermined threshold 407.

Figure 5:
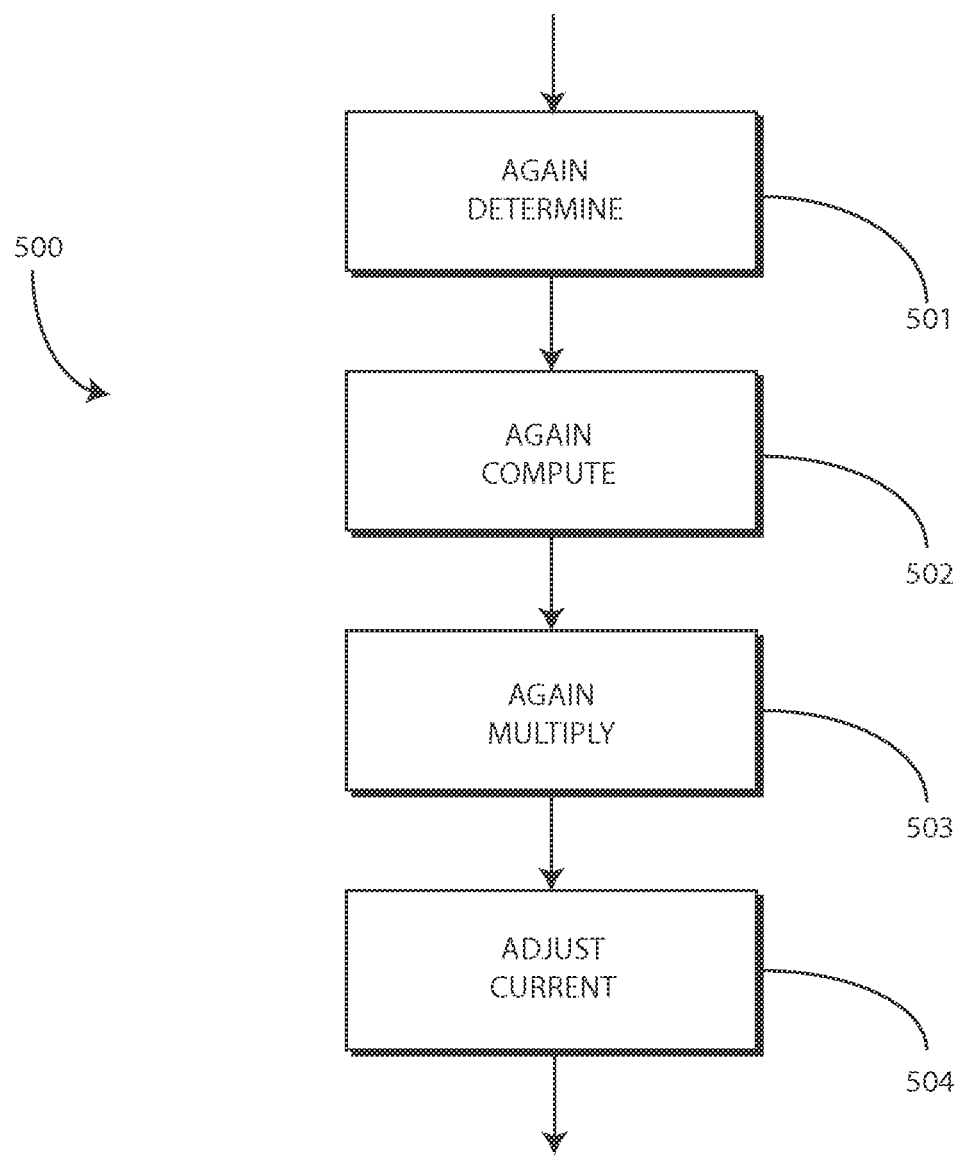
FIG. 5 illustrates additional steps of an explanatory method in accordance with one or more embodiments of the disclosure.

In one or more embodiments, the quotient scaling occurring at step (306) of FIG. 3 can occur dynamically. This is shown illustratively in FIG. 5. Turning now to FIG. 5, at step 501 the method 300 of FIG. 3 can again determine another temperature of the one or more cells. At step 502, the method 300 can—optionally—again compute another quotient of the first charging time period divided by a third charging time period defined by a third one of the plurality of different temperatures. In one or more embodiments, the third one of the plurality of different temperatures is closer to the temperature than the second one of the plurality of different temperatures described above with reference to FIG. 3. In an alternate embodiment, step 502 can comprise reading the quotient from a look-up table of a memory device.

At step 503, the method 300 can again multiply the predefined current by the another quotient to obtain another magnitude of the charging current. At step 504, the method 300 can adjust the charging current from the magnitude determined in FIG. 3 to another magnitude so that the one or more cells can be charged at a different current.

Figure 6:
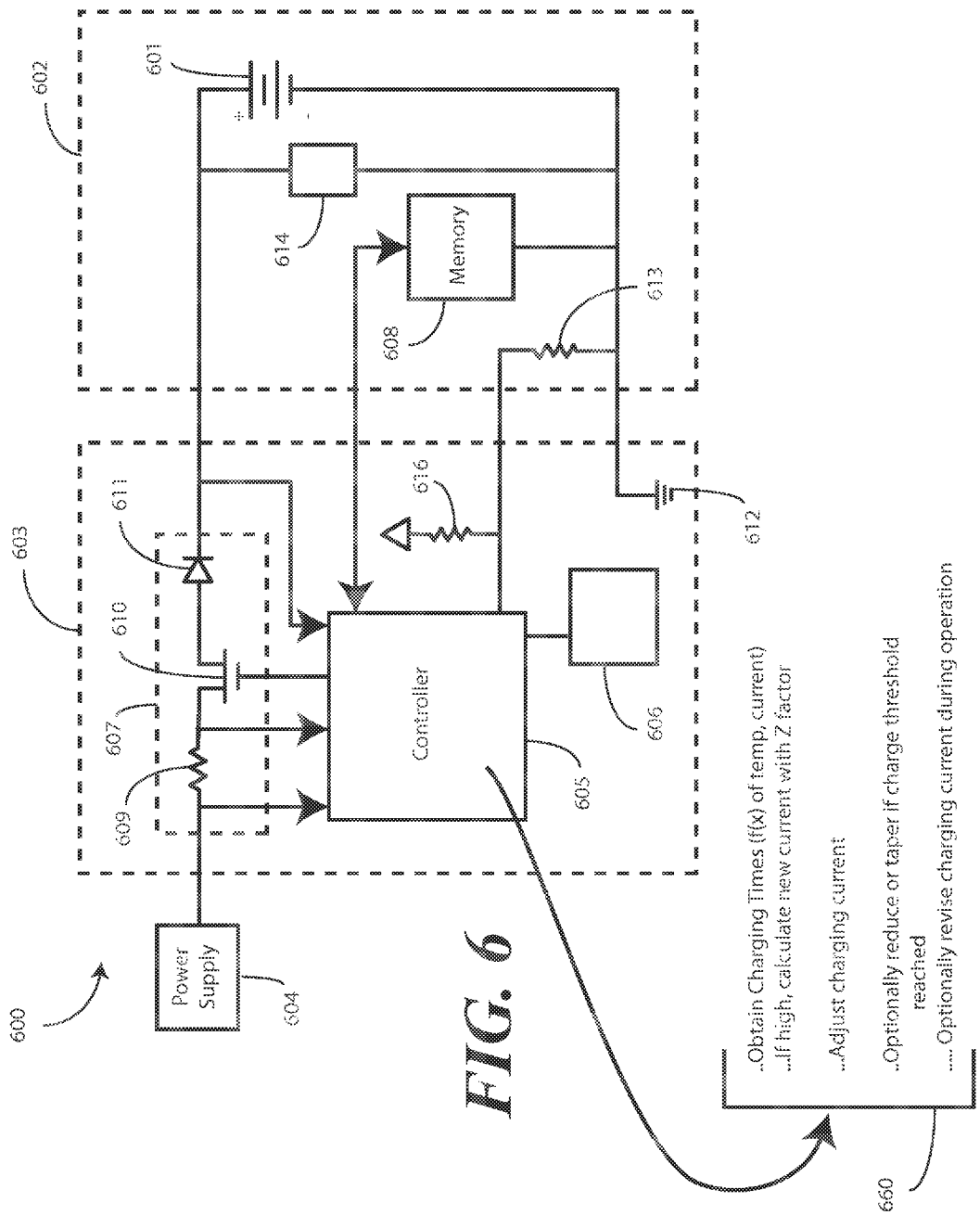
FIG. 6 illustrates a schematic diagram of an explanatory system configured in accordance with one or more embodiments of the disclosure.

Turning now to FIG. 6, illustrated therein is an explanatory system 600 configured in accordance with one or more embodiments of the disclosure. In the explanatory system 600 of FIG. 6, a charging unit 603 is shown coupled to the battery 602 and a power supply 604. The battery 602 includes one or more rechargeable cells 601. The power supply 604 can provide charging current to the charging unit 603, which can feed the charging current to the battery 602 in accordance with one or more methods described herein. The charging unit 603, as will be explained below, can include a control circuit 605 configured to control the amount of charging current that flows to the battery 602.

The explanatory embodiment of FIG. 6 illustrates the battery 602 and charging unit 603 as separate units. However, in one or more embodiments the charging unit 603 and the battery 602 may be integrated into a single electronic device. In one or more embodiments, prior to increasing the charging current by the Z-factor to more rapidly charge the one or more cells 601 at temperatures above room temperature, the charging unit 603 can be configured to confirm with a user whether such an adjustment is permissible. For example, in one embodiment, the control circuit 605 can be configured to prompt, with a user interface 606 operable with the control circuit 605, for authorization to increase the charging current to the one or more cells 601. Where an electronic signal representing authorization from the user is received, the charging current can be increased as described above.

In one or more embodiments, the battery 602 comprises one or more cells 601 that are lithium-ion cells. The charging unit 603 can be any device capable of directing and controlling charging current that flows to the battery 602. As an example, the charging unit 603 can be a mobile communications device—such as a cellular telephone, tablet computer, two-way radio, or a personal digital assistant—or a desktop charger that can provide power to a battery for a mobile communications device. Of course, the invention is not limited to these particular examples, as other suitable devices can serve as the charging unit 603 as well.

As shown in FIG. 6, the charging unit 603 can include, for example, a current control circuit 607 that is operable with the control circuit 605. The battery 602 can include, for example, a memory 608. Information can be written to the memory 608, including tables of Z-factors, or the numerators and denominators thereof, as shown in TABLE 1. Where the control circuit 60 increases the charging current by scaling with the Z-factor, this increased current magnitude can simply be read from the memory 608 in one or more embodiments. In one arrangement, the memory 608 of the battery 602 can be an electrically erasable programmable read only memory, although other suitable types of memory devices can also be used with the battery 602.

The current control circuit 607 of the charging unit 603 can include, for example, a sense resistor 609, a field effect transistor 610 and a diode 611. The control circuit 605 can use, as inputs, connections disposed on either side of the sense resistor 609. The control circuit 605 can also control the operation of the field effect transistor 610 as well. The output of the current control circuit 607 can lead to a B+ contact, which can be coupled to the one or more cells 601 of the battery 602. An input from the B+ contact can also be coupled to the control circuit 605. The negative side of the one or more cells 601 can be coupled to a B− contact, which can be coupled to a ground terminal 612 in the charging unit 603. In addition, data can be transferred between the control circuit 605 and the memory 608 through a data contact. Examples of the type of data that can be exchanged between the control circuit 605 and the memory 608 include Z-factors or the numerator and denominator thereof, or Z-factor scaled charging currents as a function of temperature, tables such as TABLE 1 above, and other information.

In one or more embodiments, the battery 602 can also include a thermistor 613. As noted above, the control circuit 605 can monitor cell temperature from the thermistor 613 through a thermistor contact. The charging unit 110 can further include a pull-up resistor 616 to a power supply to enable the control circuit 605 to measure the temperature readings generated by the thermistor 613. Although not shown, the control circuit 605 can include analog-to-digital (A/D) converters and input/outputs (I/O), which, as those of ordinary skill in the art will appreciate, can enable the control circuit 605 to receive and process the information being generated from the components described above.

In operation, when the battery 602 and power supply 604 are coupled to the charging unit 603, charging current can flow from the power supply 604 to the battery 602 through the charging unit 603 to charge the one or more cells 601 from their discharge voltage limit to the rated charging limit. The control circuit 605 can determine whether to increase the charging current in accordance with a Z-factor by sensing temperature and then accessing the aforementioned data from the memory 608. The control circuit 605 can monitor the charging current that is being transferred to the battery 602 from the sense resistor 609. The control circuit 605 can monitor the voltage on the battery 602 through the input from the B+ contact. During the charging process, the control circuit 605 can also monitor the temperature of the battery 602 from the thermistor 613. If the temperature changes, the charging current can be scaled by a new Z-factor and the control circuit 605 can adjust the flow of charging current accordingly.

In one embodiment, the control circuit 605 can execute a method 660 that is stored as executable instructions in one or more memories that are operable with the control circuit 605. In one embodiment, the method can include determining, with the thermistor 613 or another temperature sensor, a temperature of the one or more cells 601. The control circuit 605 can then scale a predetermined current, such as a 1-C current, by a Z-factor corresponding to the sensed temperature to obtain a charging current. In one embodiment the Z-factor comprises a first charging time period defined by a first time period to charge the one or more cells 601 at a first temperature divided by a predefined current by a second charging time period defined by a second time period to charge the one or more cells 601 at the second temperature with the predefined current. The control circuit 605 can then cause the current control circuit 607 to charge the one or more cells 601 with the charging current.

In on embodiment, the control circuit 605 can cause the current control circuit 607 to reduce the charging current when a voltage of the one or more cells reaches a predefined threshold. In one embodiment, the control circuit 605 can cause the current control circuit 607 to adjust the charging current as a function of the temperature of the one or more cells 601 as the temperature of the one or more cells 601 changes.

In one or more embodiments, the battery 602 can optionally include its own independent energy management circuit 614. Where such an energy management circuit is included, many of the functions of the control circuit 605 of the charging unit 603 can be embedded completely within the battery 602. The inclusion of the energy management circuit 614 allows methods of the invention to be executed completely within the battery 602, as opposed to relying upon a charger such as charging unit 603.

Figure 7:
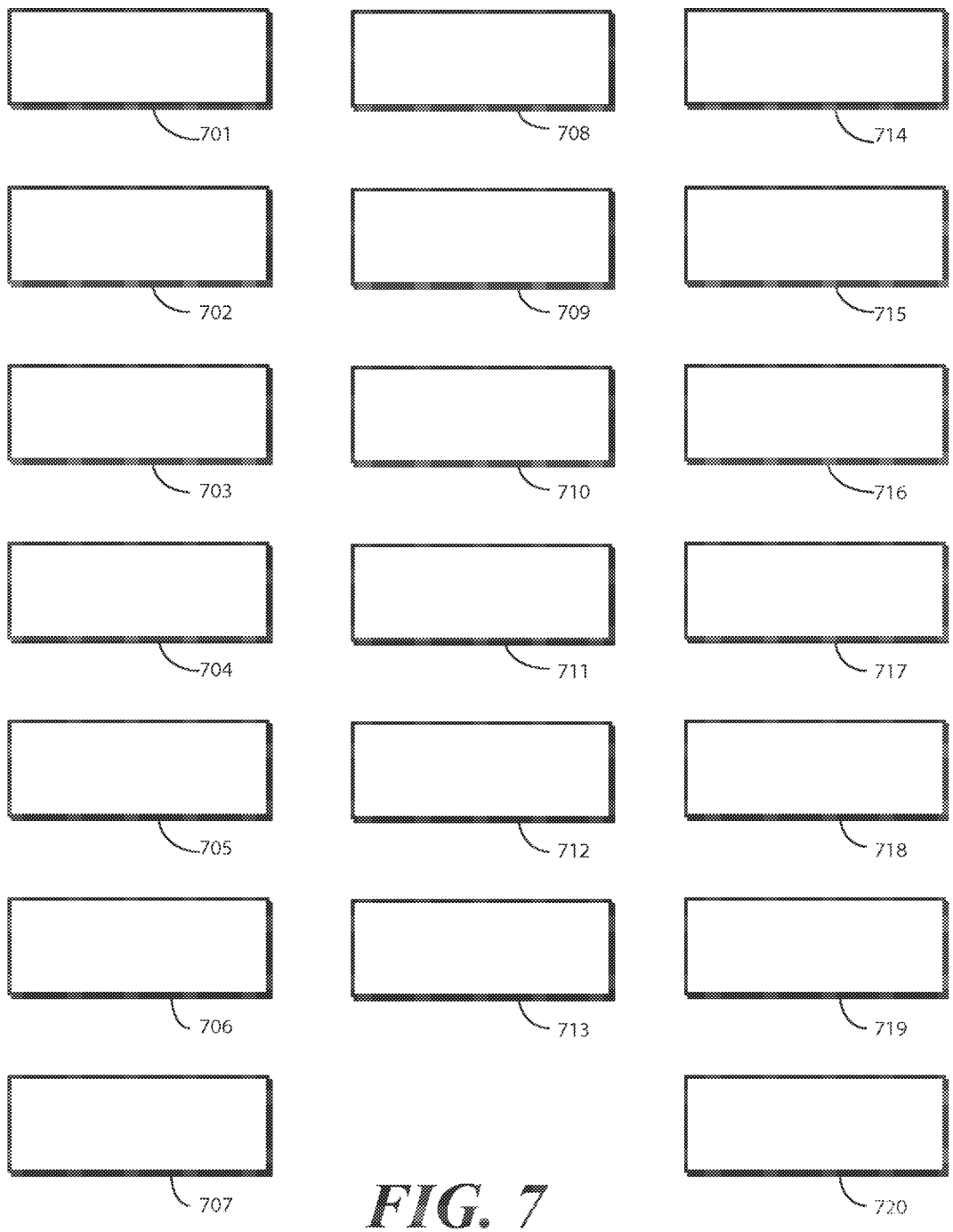
FIG. 7 illustrates various embodiments of the disclosure.

Turning now to FIG. 7, illustrated therein are various embodiments of the disclosure. At 701, a method of adjusting charging current to one or more cells includes obtaining a plurality of charging time periods. In one embodiment, at 701 each charging time period is defined as a time period required to charge the one or more cells with a predefined current at one of a plurality of different temperatures.

At 701, a temperature sensor can determine a temperature of the one or more cells. At 701, one or more processors can scale the predetermined current by a Z-factor. In one embodiment, the Z-factor is a quotient of a first charging time period defined by a first one of the plurality of different temperatures divided by a second charging time period defined by a second one of the plurality of different temperatures. In one embodiment, the second one of the plurality of different temperatures is closer to the temperature than the first one of the plurality of different temperatures. The scaling of 701 is to obtain a magnitude of the charging current. In one embodiment, at 701, one or more processors can cause a current regulator to charge the one or more cells with the charging current at the magnitude.

At 702, the predefined current of 701 can be a 1-C Rate. At 703, the first one of the plurality of different temperatures of 701 is less than the second one of the plurality of different temperatures. At 704, the first one of the plurality of different temperatures at 701 is room temperature. At 705, the method of 701 further comprises computing, with the one or more processors operable, the quotient.

At 706, the method of 701 further comprises again determining another temperature of the one or more cells. At 706, the method of 701 further comprises again multiplying, with the one or more processors, the predefined current by another quotient of the first charging time period divided by a third charging time period defined by a third one of the plurality of different temperatures to obtain another magnitude of the charging current. In one embodiment, at 706 the third one of the plurality of different temperatures is closer to the temperature than the second one of the plurality of different temperatures. At 706, one or more processors can cause the current regulator to adjust the charging current from the magnitude to the another magnitude.

At 707, the causing of 701 occurs only when the first one of the plurality of different temperatures is less than the temperature. At 708, the method of 701 further comprises monitoring a number of cycles experienced by the one or more cells and adjusting the quotient as a function of the number of cycles. At 709, the monitoring of 708 comprises estimating the number of cycles with one of a cumulative charge or a cumulative discharge of the one or more cells.

At 710, the method of 701 further comprises storing the plurality of charging time periods in a memory operable with the one or more processors. At 711, the method of 701 further comprises reducing the magnitude of the charging current when a voltage of the one or more cells exceeds a predetermined threshold.

At 712, an apparatus comprises one or more cells, a current regulator coupled serially with the one or more cells, a control circuit operable with the current regulator, and a temperature sensor, operable with the control circuit, to sense a temperature of the one or more cells. In on embodiment, the control circuit of 712 is to select, from a memory operable with the control circuit: a first charging time period defined by a first time period to charge the one or more cells at a first temperature with a predefined current; and a second charging time period defined by a second time period to charge the one or more cells at a second temperature with the predefined current. In one embodiment, the second temperature is closer to the temperature of the one or more cells than the first temperature. At 712, the control circuit is to multiply the predefined current by a quotient of the first charging time period divided by the second charging time period to obtain a charging current and cause the current regulator to charge the one or more cells at the charging current.

At 713, the control circuit of 712 is to cause the current regulator to charge the one or more cells at the predefined current when the temperature of the one or more cells is less than the first temperature. At 714, the first temperature of 713 is room temperature. At 715, the predefined current of 714 is between a 0.5-C rate and a 1-C rate. At 716, the control circuit of 712 is to reduce the charging current by tapering the charging current when a voltage of the one or more cells exceeds a predetermined threshold.

At 717, a method charging one or more rechargeable cells comprises determining, with a temperature sensor, a temperature of the one or more cells. At 717, the method includes scaling, with one or more processors, to obtain a charging current, the predefined current by a first charging time period defined by a first time period to charge the one or more cells at a first temperature divided by a predefined current by a second charging time period defined by a second time period to charge the one or more cells at the second temperature with the predefined current. At 717, the method includes charging, with a charging circuit, the one or more cells with the charging current.

At 718, the second temperature of 717 is closer to the temperature of the one or more cells than the first temperature. At 719, the method of 717 further includes reducing, with the charging circuit, the charging current when a voltage of the one or more cells reaches a predefined threshold. At 720, the method of 717 further comprises adjusting the charging current as a function of the temperature of the one or more cells as the temperature of the one or more cells changes.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method of adjusting a charging current to one or more cells, comprising:
    obtaining a plurality of charging time periods, each charging time period defined as a time period required to charge the one or more cells with a predefined current at one of a plurality of different temperatures;
    determining, with a temperature sensor, a temperature of the one or more cells;
    scaling, with one or more processors, the predefined current by a quotient of a first charging time period defined by a first one of the plurality of different temperatures divided by a second charging time period defined by a second one of the plurality of different temperatures, the second one of the plurality of different temperatures closer to the temperature than the first one of the plurality of different temperatures, to obtain a magnitude of the charging current; and
    causing, with the one or more processors, a current regulator to charge the one or more cells with the charging current at the magnitude.

2. The method of claim 1, the predefined current 1-C Rate.

3. The method of claim 1, the first one of the plurality of different temperatures less than the second one of the plurality of different temperatures.

4. The method of claim 3, the first one of the plurality of different temperatures is between zero and thirty degrees centigrade.

5. The method of claim 1, further comprising computing, with the one or more processors operable, the quotient.

6. The method of claim 1, further comprising:
    again determining, with the temperature sensor, another temperature of the one or more cells;
    again multiplying, with the one or more processors, the predefined current by another quotient of the first charging time period divided by a third charging time period defined by a third one of the plurality of different temperatures, the third one of the plurality of different temperatures closer to the temperature than the second one of the plurality of different temperatures, to obtain another magnitude of the charging current; and
    causing, with the one or more processors, the current regulator to adjust the charging current from the magnitude to the another magnitude.

7. The method of claim 1, the causing only occurring when the first one of the plurality of different temperatures is less than the temperature.

8. The method of claim 1, further comprising:
    monitoring a number of cycles experienced by the one or more cells; and
    adjusting the quotient as a function of the number of cycles.

9. The method of claim 8, the monitoring comprising estimating the number of cycles with one of a cumulative charge or a cumulative discharge of the one or more cells.

10. The method of claim 1, further comprising storing the plurality of charging time periods in a memory operable with the one or more processors.

11. The method of claim 1, further comprising reducing the magnitude of the charging current when a voltage of the one or more cells exceeds a predetermined threshold.

12. An apparatus, comprising:
    one or more cells;
    a current regulator coupled serially with the one or more cells;
    a control circuit operable with the current regulator;
    a temperature sensor, operable with the control circuit, to sense a temperature of the one or more cells;
    the control circuit to:
        select, from a memory operable with the control circuit:
            a first charging time period defined by a first time period to charge the one or more cells at a first temperature with a predefined current; and
            a second charging time period defined by a second time period to charge the one or more cells at a second temperature with the predefined current;
            the second temperature closer to the temperature of the one or more cells than the first temperature;
        multiply the predefined current by a quotient of the first charging time period divided by the second charging time period to obtain a charging current; and
        cause the current regulator to charge the one or more cells at the charging current.

13. The apparatus of claim 12, the control circuit to cause the current regulator to charge the one or more cells at the predefined current when the temperature of the one or more cells is less than the first temperature.

14. The apparatus of claim 13, the first temperature room temperature.

15. The apparatus of claim 14, the predefined current between a 0.5-C rate and 1-C rate.

16. The apparatus of claim 12, the control circuit to reduce the charging current by tapering the charging current when a voltage of the one or more cells exceeds a predetermined threshold.

17. A method charging one or more rechargeable cells, comprising:
    determining, with a temperature sensor, a temperature of the one or more cells;
    scaling, with one or more processors, to obtain a charging current, a predefined current by a first charging time period defined by a first time period to charge the one or more cells at a first temperature divided by a predefined current by a second charging time period defined by a second time period to charge the one or more cells at a second temperature with the predefined current;

charging, with a charging circuit, the one or more cells with the charging current.

18. The method of claim 17, the second temperature closer to the temperature of the one or more cells than the first temperature.

19. The method of claim 17, further comprising reducing, with the charging circuit, the charging current when a voltage of the one or more cells reaches a predefined threshold.

20. The method of claim 17, further comprising adjusting the charging current as a function of the temperature of the one or more cells as the temperature of the one or more cells changes.

* * * * *